(12) United States Patent
Ketting et al.

(10) Patent No.: US 6,412,887 B1
(45) Date of Patent: Jul. 2, 2002

(54) TWO-PIECE MASTER CHAIN LINK

(75) Inventors: Michael Ketting, Ennepetal; Friedrich Böttger, Haan, both of (DE)

(73) Assignee: Intertractor GmbH, Gevelsberg (DE)

( * ) Notice: Subject to any disclaimer, the term of this patent is extended or adjusted under 35 U.S.C. 154(b) by 0 days.

(21) Appl. No.: 09/694,770

(22) Filed: Oct. 23, 2000

(30) Foreign Application Priority Data

Oct. 23, 1999 (DE) ...................................... 299 18 683 U

(51) Int. Cl.[7] .................................................. B62D 55/20
(52) U.S. Cl. ........................................ 305/186; 305/201
(58) Field of Search .............................. 305/185, 186, 305/188, 190, 200, 201

(56) References Cited

U.S. PATENT DOCUMENTS

| | | | |
|---|---|---|---|
| 3,053,579 A | * | 9/1962 | Trudeau |
| 3,427,079 A | | 2/1969 | Skromme |
| 3,659,112 A | | 4/1972 | Stedman |
| 4,105,260 A | | 8/1978 | Blunier |
| 4,351,573 A | * | 9/1982 | Bedis et al. |
| 4,361,364 A | | 11/1982 | Brunn |
| 4,365,848 A | | 12/1982 | Grilli |
| 4,457,565 A | | 7/1984 | Bissi |
| 4,636,014 A | * | 1/1987 | Dennison et al. |

* cited by examiner

*Primary Examiner*—Russell D. Stormer
(74) *Attorney, Agent, or Firm*—Herbert Dubno; Andrew Wilford

(57) ABSTRACT

A chain master link has first and second link parts having outer ends centered on respective substantially parallel first and second axes and coupled-together inner ends. Each inner end is formed with at least one tooth extending transversely across a plane including the two axes and having an inner face turned toward the respective axis and forming with the plane an angle of at least 90° open away from the respective axis. The teeth are engaged together with the inner faces bearing on each other so that tension pulling the parts apart along the plane pulls the teeth into engagement with each other. Each part is formed with a pocket receiving the tooth of the other part and having an outer face forming with the plane an angle open away from the respective axis and greater than the respective inner-face angle. Thus the two parts can be fitted together simply by pivoting their inner ends toward each other about the respective outer-end axes.

4 Claims, 2 Drawing Sheets

TWO-PIECE MASTER CHAIN LINK

FIELD OF THE INVENTION

The present invention relates to a chain link. More particularly this invention concerns two-piece master chain link used on a conveyor or track chain.

BACKGROUND OF THE INVENTION

A standard master link for a track chain or the like is formed of a pair of link members that extend between a sleeve at one end and a pin at the other, the sleeve and the pin being centered on parallel axes spaced apart in a standard pull or tension direction. Each link member is in turn formed by a pair of link parts each having an outer end centered on one of the respective axes and an inner end coupled to the inner end of the other link part. One side of each link is normally bolted to a grouser plate and the opposite side of each link rides on the drive and idler wheels over which the chain passes for conveying material or advancing a vehicle using the chain as traction element. At each axis there is a pin passing through a sleeve and having ends projecting past the sleeve ends. The outer ends of two of the link members of one link are fixed on the pin ends and the outer ends of the two link members of an adjacent link are fixed therebetween on the sleeve so that the two links can pivot relative to each other, with rotation of the pin and sleeve relative to each other.

The master link is intended to be opened for removal or repair of the chain. To this end the link parts are coupled together between the two axes, normally by interengaging teeth. In U.S. Pat. No. 3,659,112 of Stedman such a system is described where the two link parts are joined together generally at a plane extending perpendicular to the outer-end axes. The interengaging teeth extend and interengage parallel to these axes and the two link parts are secured together by one or more bolts extending parallel to the axes, with the shank of each bolt threaded into one of the link parts and the head of each bolt bearing on the other link part. The teeth are triangular so that tension in the link cams the parts apart and subjects the bolts to considerable shear forces.

In commonly owned U.S. Pat. No. 4,361,364 of Brunn the teeth are hook-shaped and arcuate, centered on one of the axes. Thus the link parts can be hooked together with most of the force transmission being between the faces of the interengaged teeth. In this system the grouser-plate screws keep the two link parts parallel to each other and are not subject to significant shear forces from tension in the chain. Both these systems have the disadvantage that assembly of the master link is fairly difficult, especially at it is normally done in a tracked vehicle in the upper stretch where there is little room to work above the chain.

In the systems of U.S. Pat. No. 3,427,079 of Skromme, U.S. Pat. No. 4,105,260 of Blunier, U.S. Pat. No. 4,365,848 of Grilli, and U.S. Pat. No. 4,457,565 of Bissi two link parts meet at a plane extending generally diagonally of the pull direction so that rather than right and left link parts one has upper and lower link parts. The interengaging teeth extend across this connection plane and the two link parts are held together by bolts extending perpendicular to the tension direction. In all these systems, which have the advantage of easy assembly, the teeth serve principally to position the link parts relative together while the assembly bolts provide the force to hold them together. Once again, these bolts are subject to considerable shear. If they fail the link will open.

Another problem with all these systems is that the link parts are expensive to manufacture. They are normally produced by casting and forging, then they must be carefully machined to produce the interfit that is necessary for good force transmission.

OBJECTS OF THE INVENTION

It is therefore an object of the present invention to provide an improved master link for a conveyor or track chain.

Another object is the provision of such an improved master link for a conveyor or track chain which overcomes the above-given disadvantages, that is which is of simple and inexpensive manufacture, which will have a long service life, and which is easy to install and remove.

A further object is to provide an easy-to-assemble master link where the assembly bolts are not subject to any substantial shear.

SUMMARY OF THE INVENTION

A chain master link has first and second link parts having outer ends centered on respective substantially parallel first and second axes and coupled-together inner ends. Each inner end is formed with at least one tooth extending transversely across a plane including the two axes and having an inner face turned toward the respective axis and forming with the plane an angle of at least 90° open away from the respective axis. The teeth are engaged together with the inner faces bearing on each other so that tension pulling the parts apart along the plane pulls the teeth into engagement with each other.

Thus a force pulling the outer ends of the link parts part will pull the teeth into tighter engagement with each other. Instead of this force camming the teeth apart, it actually forces them into more solid engagement with each other.

According to the invention each part is formed with a pocket receiving the tooth of the other part and having an outer face forming with the plane an angle open away from the respective axis and greater than the respective inner-face angle. Thus the two parts can be fitted together simply by pivoting their inner ends toward each other about the respective outer-end axes. Thus the inner and outer faces of each part actually converge toward each other. If the two parts are pushed slightly together, it is very easy to unhook them from each other, so that disassembly is as easy as assembly. There is no need to clamp the two parts temporarily while an assembly bolt is fitted and tightened.

In order that the chain incorporating the master link according to the invention can move around guide or drive wheels, a certain hinge angle is necessary. This angle represents the maximum deflection of the plane of one link to the adjacent link, of course about the axis where they are joined. In accordance with the invention the angle of the tooth inner face is a function of this hinge angle as well as of the coefficient of friction between the engaging tooth faces.

In accordance with the invention one of the link parts is formed with a throughgoing hole extending substantially perpendicular to the plane and the other link part is formed with a threaded hole aligned with the throughgoing hole. A bolt bears on the one link part, extends through the throughgoing hole thereof, and is threaded into the threaded hole of the other link part. This bolt fits with play in the throughgoing hole of the one link part.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
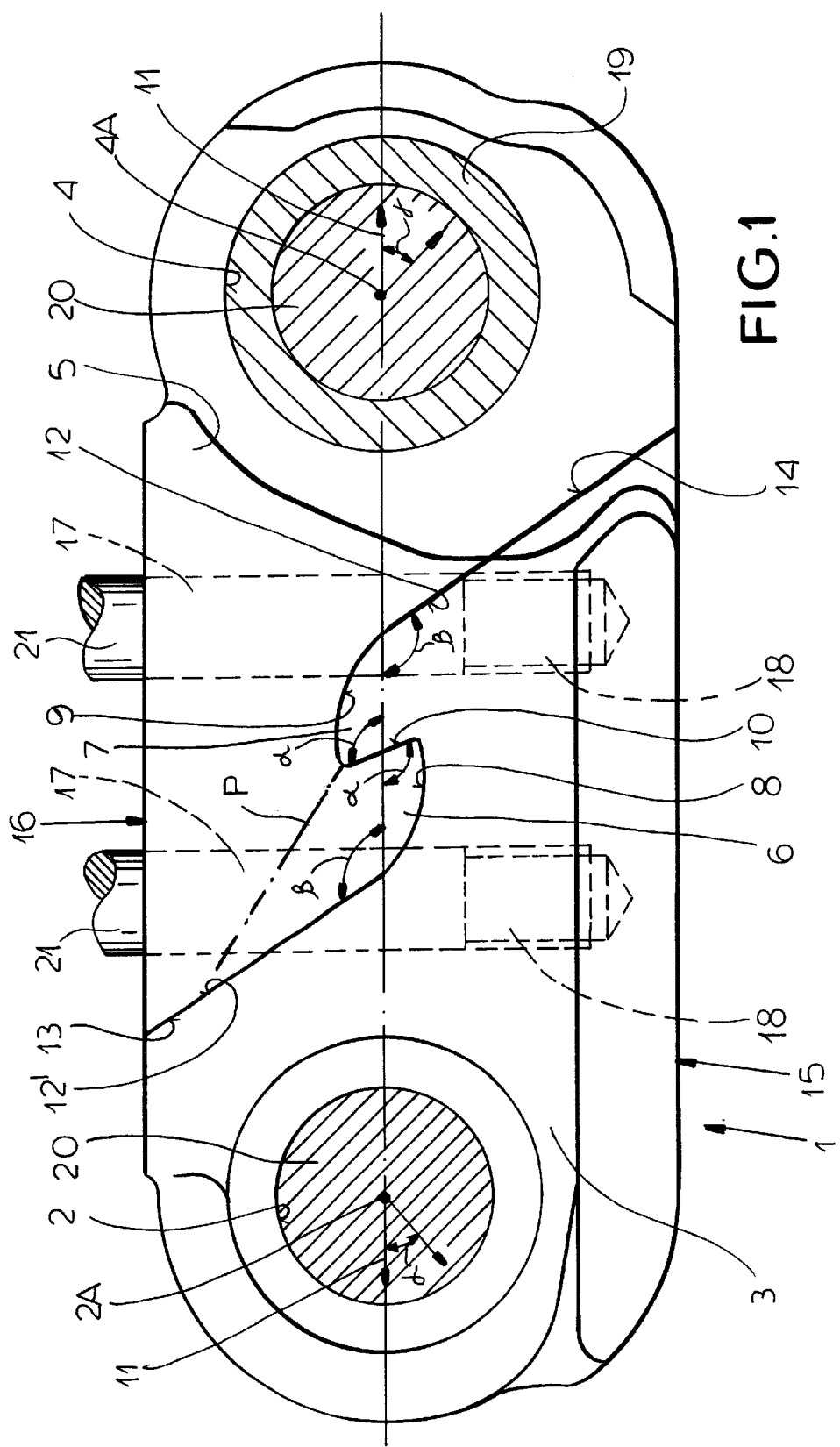
FIG. 1 is a side view of a master link according to the invention.

As seen in FIG. 1 a split master link 1 has two parts 3 and 5. The part 3 is formed at an outer end with a small-diameter pin eye 2 centered on an axis 2A and the part 5 at an opposite outer end with a large-diameter sleeve eye 4 centered on an axis 4A. In practice two such parts 3 and two such parts 5 are used to form a link with the ends having the eyes 4 spaced axially more closely than the ends having the eyes 2 so that the more closely spaced ends can lie between the widely spaced ends of an adjacent link. A sleeve indicated at 19 is fixed in the eyes 4 and a pin shown at 20 in the eyes 2, coaxially inside another such sleeve 19, with the eyes 2 fitted over the pin ends beyond the ends of the respective sleeve. This structure is generally standard. Thus the axes 2A and 3A lie in a common plane 11.

The parts 3 and 5 are formed with spectrally identical and interengaging teeth 7 and 6 and immediately outward of the respective teeth with respective recesses or pockets 8 and 9 complementary to the teeth 6 and 7. Thus the two parts 3 and 4 are joined together generally at a plane P extending at an acute angle to the plane 11 and perpendicular to the plane of view of FIG. 1, that is parallel to the axes 2A and 4A. According to the invention the teeth 6 and 7 meet at inner surfaces 10 that are planar and that extend at an angle $\alpha$ to the plane 11 including the two axes 2A and 4A and parallel to the direction in which the link 1 is subject to tension in normal use. In addition the teeth 6 and 7 have planar back surfaces 13 and 14 that sit flatly on outer surfaces 12 and 12' of the link parts 3 and 5. The surfaces 13 and 14 extend at angles $\beta$ that are greater than the angles $\alpha$ so that the two link parts 3 and 5 can be fitted together by rotation about the respective axes 2A and 4A. Similarly the link parts 3 and 5 can be uncoupled by pushing them slightly together parallel to the plane 11 so that the surfaces 13 and 14 cam up the surfaces 12 and 12', disengaging the teeth 6 and 7 from each other.

The link 1 has an inner face 15 that normally rides on guide and drive wheels that support the chain it forms and an outer face 16 to which is bolted a grouser plate of standard construction. To this end the link part 5 is formed with a pair of throughgoing bores 17 extending perpendicular to the plane 11 and the link part 3 with a pair of threaded bores 18 in alignment therewith capable of holding bolts indicated partially at 21, these bolts 21 having heads bearing on the unillustrated grouser plate. The bolts 21 fit with some play in the holes 17 so that they are not stressed in shear under normal circumstances.

The angle $\alpha$ is a function of the coefficient of friction between the surfaces 10 and a hinge angle $\gamma$ of the chain. With a hinge angle $\gamma$ of 40°, as illustrated, and a coefficient of friction of 0.15 (corresponding to an angle of 8.5°) the angle $\alpha$ is preferably 90°+40°+8.5°=121.5°. In any case the angle $\alpha$ is set large enough that the link will self lock, that is tension along the plane 11 will pull the two parts 3 and 5 together.

Figure 2:
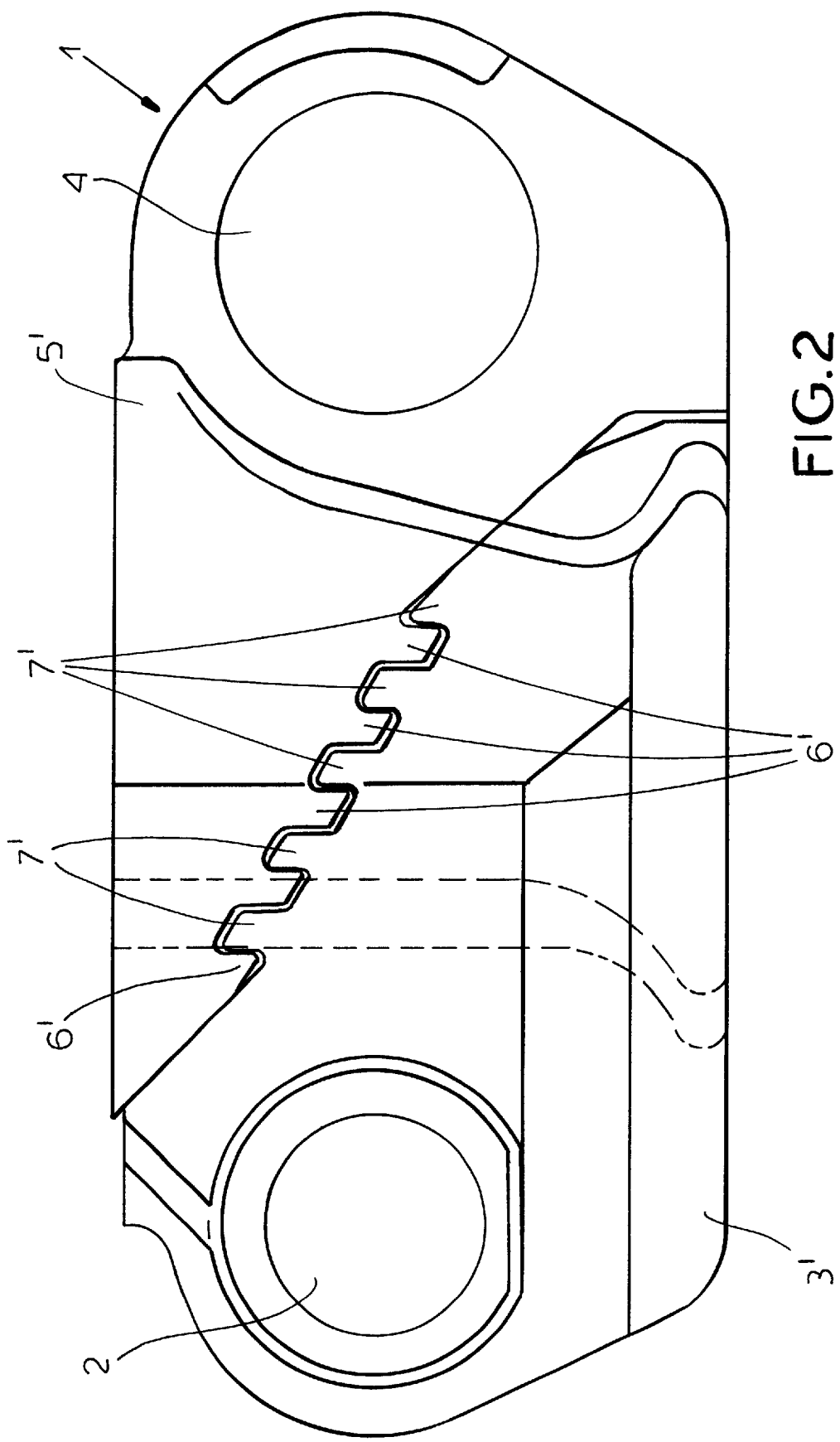
FIG. 2 is a side view of another master link in accordance with the invention.

In an arrangement with multiple teeth 6' and 7' as shown in FIG. 2 the angle $\beta$ increases on each part 3' from right to left on the teeth 7', as of course does the angle $\alpha$. The angle $\beta$ of the other part 5' increases oppositely, from left to right.

What is claimed is:

1. A chain master link comprising a link part having an outer end centered on an axis and an inner end remote therefrom;

another link part having an outer end centered on an axis and an inner end remote therefrom, the axes being parallel to each other and defining a plane; and respective teeth formed on the inner ends and each extending transversely across the plane, each tooth having a respective substantially planar inner face turned toward the respective axis and forming with the plane an obtuse angle open away from the respective axis, the teeth being engaged together with the inner faces bearing on each other, whereby tension pulling the parts apart along the plane pulls the teeth into engagement with each other.

2. The chain master link defined in claim 1 wherein each part is formed with a pocket receiving the tooth of the other part and having an outer face forming with the plane an angle away from the respective axis and greater than the respective inner-face angle.

3. The chain master link defined in claim 1 wherein one of the link parts is formed with a throughgoing hole extending substantially perpendicular to the plane and the other link part is formed with a threaded hole aligned with the throughgoing hole, the link further comprising a bolt bearing on the one link part, extending through the throughgoing hole thereof, and threaded into the threaded hole of the other link part.

4. The chain master link defined in claim 3 wherein the bolt fits with play in the throughgoing hole of the one link part.

* * * * *